United States Patent [19]

Tesoro et al.

[11] Patent Number: 5,260,411
[45] Date of Patent: Nov. 9, 1993

[54] POLYIMIDE RESINS

[75] Inventors: Giuliana C. Tesoro, Dobbs Ferry; Vinod R. Sastri, Brooklyn, both of N.Y.

[73] Assignee: Polytechnic University, Brooklyn, N.Y.

[21] Appl. No.: 183,721

[22] Filed: Apr. 20, 1988

[51] Int. Cl.$^5$ .................... C08G 69/26; C08G 75/00; C08G 75/14
[52] U.S. Cl. .................... 528/353; 528/125; 528/126; 528/128; 528/172; 528/322; 528/350; 528/351; 528/352; 528/375; 528/376; 528/387; 525/348; 525/422
[58] Field of Search ............... 525/132, 140, 150, 170, 525/184, 186, 348, 397, 422, 356, 261; 528/125, 128, 172, 322, 375, 376, 387, 353, 350-352

[56] References Cited

U.S. PATENT DOCUMENTS

| | | | |
|---|---|---|---|
| 2,444,536 | 7/1948 | Searle | 548/521 |
| 2,466,963 | 4/1949 | Patrick et al. | 528/387 |
| 3,051,695 | 8/1962 | Warner et al. | 528/387 |
| 3,297,713 | 1/1967 | Ladd | 528/390 |
| 3,766,138 | 10/1973 | Crivello | 528/353 |
| 4,323,662 | 4/1982 | Oba et al. | 525/281 |
| 4,413,107 | 11/1983 | Locatelli | 526/262 |
| 4,680,378 | 7/1987 | Hefner, Jr. | 528/320 |
| 4,754,016 | 6/1988 | Ai et al. | 528/26 |
| 4,882,399 | 11/1989 | Tesoro et al. | 528/109 |

OTHER PUBLICATIONS

CA 110:213999; "Recoverable Polyimide Resins", Sastri, et al.
King, Modern Plastics Encyclopedia, p. 18, 1986-1987.

Primary Examiner—John Kight, III
Assistant Examiner—P. Hampton-Hightower
Attorney, Agent, or Firm—Curtis, Morris & Safford

[57] ABSTRACT

A method for the preparation of a polyimide containing reversible crosslinks comprising the step of curing a monomer having the formula

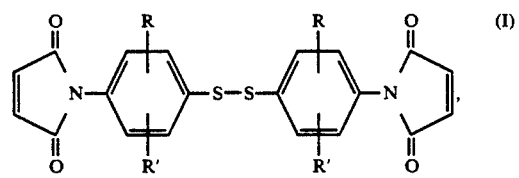

wherein R and R' may be the same or different and each is H or lower alkyl having 1-5 carbon atoms under conditions conducive to the formation of a polyimide and thereby forming a polyimide having the formula

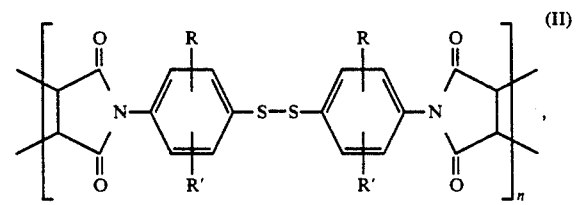

R and R' are as defined above and n is an integer from 10 to 100. The polyimide may be converted to a soluble polymer by cleaving the disulfide bond in the presence of a solvent and a reducing agent. The reduced polymer may be reformed into the polymer in an oxidation step or into a modified polyimide in other reaction steps. Copolymerization processes are also disclosed.

12 Claims, No Drawings

POLYIMIDE RESINS

The invention described herein was made with the support of the Federal Government and the Federal Government has certain rights in the invention.

FIELD OF THE INVENTION

The invention relates broadly to polyimide resins. More specifically, the invention relates to thermosetting polyimides containing disulfide bonds. The insoluble, infusible polymers can be converted to soluble and therefore recoverable polyimide materials without degradation by methods of the invention and can thereafter be reformed, modified to improve their properties, and cured to form new polymers. The invention relates to methods for homopolymerizing and copolymerizing disulfide-containing bismaleimides, to the polymer and copolymer structures obtained, to methods for preparing condensation polyimides from disulfide-containing aromatic diamines with dianhydrides of tetracarboxylic acids or their derivatives, to methods for converting such polymers to soluble forms, to methods for reforming the insoluble polymers, to methods for modifying the soluble form of the thermoset polymers, and to the products themselves.

BACKGROUND OF THE INVENTION

Bismaleimide polymers are a recently developed class of polymeric materials that have grown in importance as high strength materials that can perform at high temperatures. Polyimides prepared from bismaleimides are distinguished from other polyimides by their ease of processing, a function of their fully imidized form.

Bismaleimides are prepared by the condensation reaction of a diamine, e.g., methylenedianiline, with maleic anhydride and subsequent imide formation (cyclization). The condensation product tends to be crystalline and has a high melting point. While eutectic blends of different bismaleimides may be used to reduce the melting point of the polyimides formed from them, generally coreactants may be used to make bismaleimides processible, and to obtain the desired properties in the cured resins.

Bismaleimides are reactive because of the double bond on each end of the molecule. They can therefore react with themselves or with other compounds containing functional groups. Coreactants typically improve bismaleimide strength and toughness, and the ease of processing. When amines or other nucleophiles are used to co-cure a bismaleimide, the copolymer is less brittle than the homopolymer.

Bismaleimides are typically cured at temperatures of from 200° C. to 350° C. for 1 to 4 hours. Curing may be followed by a postcure step at about 350° C. for 4 hours, to fully develop their properties. The glass transition temperatures of the polymers usually exceed 300° C. The polymers may be used at temperatures exceeding 350° C.

The monomers from which the bismaleimide polymers are obtained are those, for example, taught in U.S Pat. No. 3,297, 713 to Ladd. That patent discloses the preparation of symmetrical dithiobis (N-phenylmaleimides).

U.S Pat. No. 4,323,662 to Oba et al. discloses a broad range of bismaleimide-containing polymers and methods for forming those polymers.

While polyimide resins have been prepared by prior art methods and have demonstrated satisfactory properties for their intended uses, attempts to reuse the resins have not been successful. The cured polymers are generally insoluble, infusible, and not in any sense recoverable or modifiable. The art has heretofore failed to provide any method for reversibly crosslinking polyimide resins. Practically speaking, commercial polyimide resins cannot be recovered and the constituents thereof cannot be reused in new or modified resin structures.

OBJECTS OF THE INVENTION

It is the primary object of this invention to provide methods for the preparation of polyimides containing reversible chemical bonds in the structure.

It is another primary objective of this invention to provide polyimide resins having reversible crosslinks such that the polyimides can be efficiently solubilized and the oligomeric and polymeric constituents thereof recovered.

It is a related purpose of this invention to provide thermoset polyimide resins which are recoverable through solubilization, and which have satisfactory physical and chemical properties in comparison with nonrecoverable known polyimide structures.

It is still a further object of this invention to provide methods for solubilizing the polyimides, to prepare the soluble form thereof, and to provide methods for reforming the solubilized material into a crosslinked material.

It is still a further and related object of this invention to provide methods for solubilizing polyimides and then modifying the solubilized form to prepare novel modified polymers of desirable properties.

SUMMARY OF THE INVENTION

These and other objects of the invention are achieved in methods for the preparation of polyimides containing reversible crosslinks which comprise the step of curing a monomer having the formula

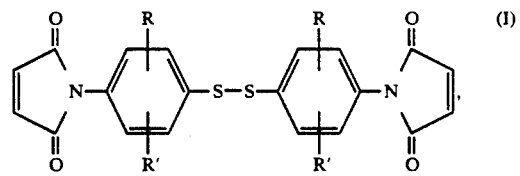

wherein R and R' may be the same or different and each is H or lower alkyl having 1 to 5 carbon atoms under conditions conducive to the formation of a polyimide and thereby forming the polyimide having the formula

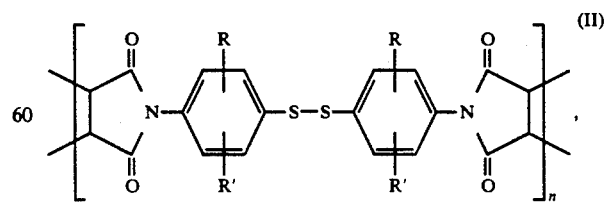

wherein R and R' are as defined above and n is an integer from 10 to 100. The invention also provides methods for polymerizing comonomers with the bismaleimides to form copolyimides.

The polyimides and copolyimides can be solubilized by cleaving the disulfide bond in the polyimide or copolyimide by reducing the polyimide in the presence of a solvent and a reducing agent and thereby producing a new soluble polymer. The soluble polymer may, in turn, be reformed into a new insoluble polyimide by oxidation or by reaction with polyfunctional reagents.

The invention affords heretofore unachievable flexibility in the reuse of insoluble, infusible polyimide structures in that these structures can be solubilized and then reformed, or, alternatively, the solubilized form can be modified by reaction with, e.g., bifunctional alkylating agents, to form different classes of polyimides.

The invention also relates to methods for the preparation of polyimides containing reversible crosslinks which comprise the step of curing a monomer having the formula

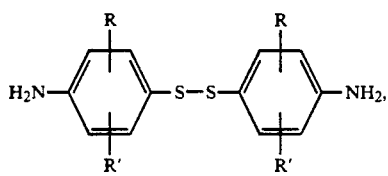

wherein R and R' may be the same or different and each is H or lower alkyl having 1 to 5 carbon atoms with a comonomer compound or derivative of such compound having the formula

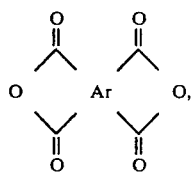

wherein Ar is a tetravalent aromatic radical under conditions conducive to the formation of a polyimide and thereby forming a polyimide having the formula

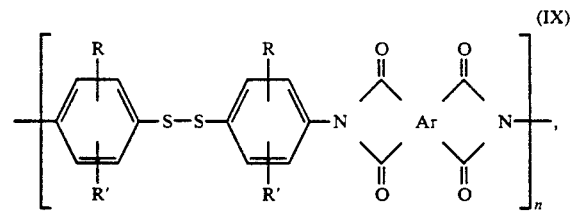

wherein R and R' are as defined above and n is an integer from 10 to 100.

The invention also relates to the polyimides thus formed, to methods for solubilizing such polyimides, reforming them by oxidation, and modifying them, as well as to the soluble forms prepared during these steps.

The invention also relates to the preparation of polyimides containing reversible bonds by condensing the bismaleimide monomers described above with dienes in a polymerization step, and to the solubilization, reformation, and modification steps as briefly described above.

The invention also includes methods for forming disulfide-containing polyimides by Michael addition reactions in which the disulfide-containing bismaleimides (I) are reacted with Michael addition comonomers, and to the copolyimides, methods for reduction, oxidation, and modification as described.

The invention also is directed to methods for the preparation of polyimides having reversible bonds by reacting disulfide-containing bismaleimides, e.g., formula I, with aromatic or aliphatic dihydrazides.

The invention permits heretofore unobtained level of flexibility in adapting polyimides for different uses and applications. For example, siloxane-modified polyimides which have recently been developed as coatings in microelectronic applications and as high temperature adhesives can be prepared according to the invention. The siloxane-modified disulfide-containing polyimides can be removed from the device or product containing them by the solubilization reactions described. Where coatings are made of siloxane-modified polyimides, the substrate materials can be reprocessed for repair of costly devices without entailing major processing steps.

In general, the polyimides of the invention can be reused and the relatively costly materials in the polyimide structures can be reapplied several times for different purposes. This recycle capability has major economic consequences.

The ability to modify the soluble form of the polymer lends still further flexibility to the use of polyimides.

In still a further embodiment of the invention, inherently photosensitive polyimides can be obtained from ortho-alkyl substituted disulfide-containing monomers.

DETAILED DESCRIPTION OF THE INVENTION

The invention is in a method for the preparation of polyimide polymers containing reversible disulfide crosslinks and comprises the step of curing a monomer having the formula

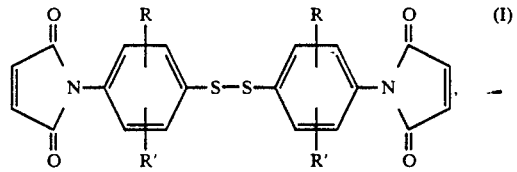

wherein R and R' may be the same or different, and each is H or lower alkyl having 1 to 5 carbon atoms under conditions conducive to the formation of a polyimide and thereby forming a polyimide homopolymer having the formula

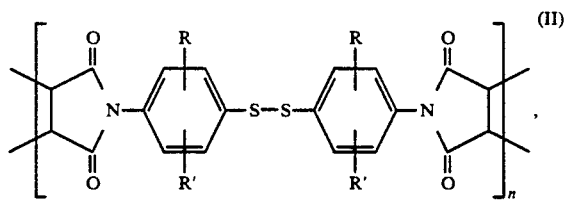

wherein R and R' are as defined above, and n is an integer from 10 to 100. Typically, the curing is carried out at 200° C. to 350° C. Among the preferred polyimides formed according to the invention are those wherein R and R' are both H. Other preferred polyimides are those wherein R and R' are —CH₃, —C₂H₅, and —C₃H₇, and are each ortho to the nitrogen atom.

The polyimides may be converted to a soluble polymeric form by cleaving the disulfide bond in the polyimide by reducing it in the presence of a solvent, typically an inert ethereal solvent such as diglyme, dioxane, triglyme, or tetrahydrofuran, and a reducing agent, typically selected from the group consisting of tributylphosphine, sodium borohydride, triphenylphosphine, and alkali metal hydrides and thereby producing a soluble polymer having the formula

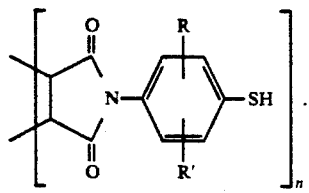  (III)

The soluble form may be reformed into a polyimide having the formula II by oxidizing the soluble polymer to reform the polyimide. The oxidizing agent is typically selected from the group consisting of iodine, air, and hydrogen peroxide.

It is envisioned that it may be of significant value to solubilize the polyimides of the invention and thereafter reform them in order to recover or reprocess the resins. Alternatively, the soluble polymer, i.e., formula III, can be modified by reacting it with a bifunctional alkylating agent selected from the group consisting of aliphatic or aromatic dihalides, -diepoxides, and aromatic bismaleimides. Among the preferred bifunctional alkylating agents are dibromobutane and xylylene dibromides.

The invention also relates to methods for the preparation of polyimide copolymers containing reversible bonds which comprise the step of curing a monomer having the formula I, wherein R and R' may be the same or different and each is H or lower alkyl having 1 to 5 carbon atoms together with a comonomer of the formula

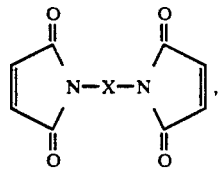  (IV-A)

or a comonomer of the formula

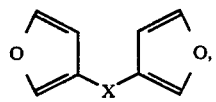  (IV-B)

wherein X is a divalent alipahtic, aromatic, or alkyl aromatic radical of 6 to 25 carbon atoms under conditions conducive to the formation of a copolyimide having the formula

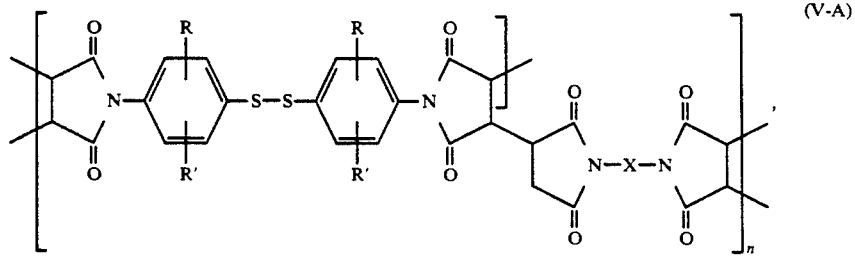  (V-A)

or

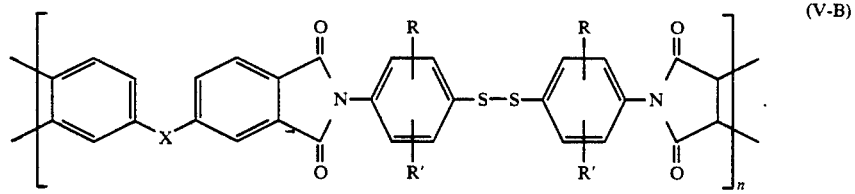  (V-B)

The copolyimides having formulae V-A and V-B may be solubilized by cleaving the disulfide bonds therein by reducing the copolyimides in the presence of a solvent and a reducing agent and thereby producing a soluble polymer having the formula

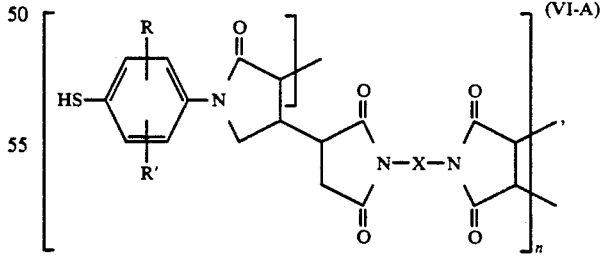  (VI-A)

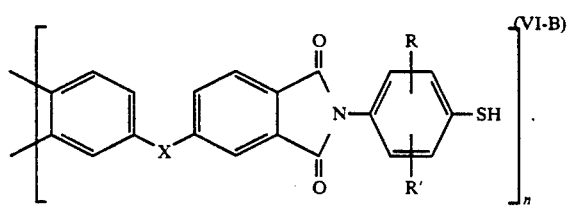  (VI-B)

The methods for reducing the copolymers are substantially the same as described above for the bismaleimide homopolymers.

The solubilized polymer may be reformed by oxidation, as described above for the homopolymer, or the solubilized polymer may be modified as described above by reaction with a bifunctional alkylating agent as described above with respect to the copolymers.

The invention is also in methods for the preparation of disulfide-containing, recoverable condensation polyimides by reacting diamines, e.g., symmetrical, aromatic diamines of the formula

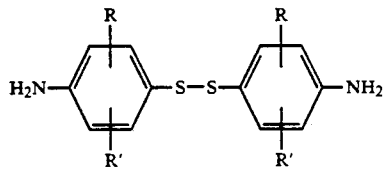

(VII)

in condensation reactions with comonomers having the formula

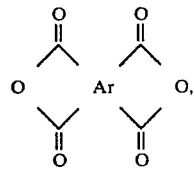

(VIII)

wherein Ar is a tetravalent aromatic radical under conditions conducive to the formation of a polyimide and thereby forming a polyimide having the formula

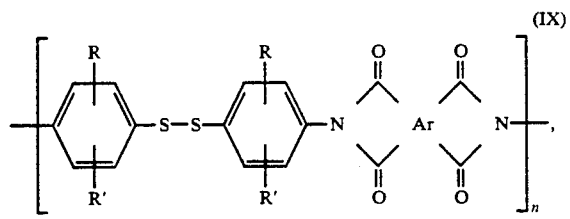

(IX)

wherein R and R' are as defined and n is an integer from 10 to 100. The cocondensation comonomer may advantageously be a dianhydride of tetracarboxylic acid, or an appropriate derivative thereof. The curing step is typically carried out at 150° to 350° C. after formation of the polyamic acid to obtain a fully imidized condensation polyimide. Solubilization, reformation, and modification steps may be carried out as described above.

The useful polyimides having reversible crosslinks can also be obtained by reacting bismaleimides having formula I together with dienes through intermolecular Diels Alder polymerization reactions, as shown, for example, in U.S. Pat. No. 4,656,235 for siloxane-containing bisfurans. Bismaleimides having formula I are reacted with stoichiometric amounts of a diene having the formula

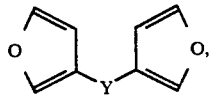

(IV-C)

wherein Y is an aliphatic or aralkyl hydrocarbon radical of 3 to 10 carbon atoms (e.g., p-xylelene) or

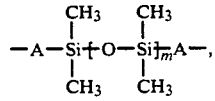

A is a divalent alkyl or aryl radical having 3 to 6 carbon atoms, and m is an integer from 1 to 10, under conditions conducive to the formation of a polyimide and thereby forming a polyimide having the formula

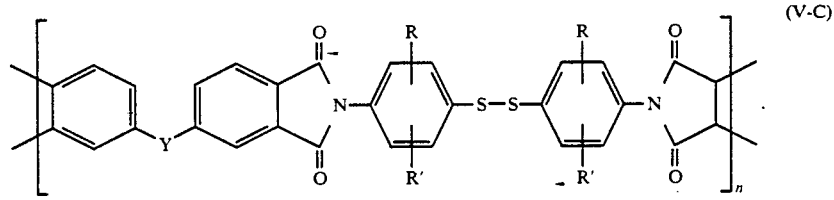

(V-C)

The reduction, reformation, and modification steps are as described above.

Useful disulfide-containing polyimides may also be obtained to meet specific requirements by Michael-type addition reactions of bismaleimides of formula I with compounds of the formula

HX—Q—XH wherein Q is an alkyl, aryl, or aralykyl radical having 6 to carbon atoms, or

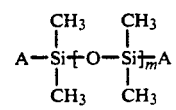

where A is a divalent alkyl or aryl radical having 3 to 6 carbon atoms and m is an integer from 1 to 10 and X is —N, —O, or —S, under conditions conducive to the formation of a polyimide and thereby forming a polyimide having the formula

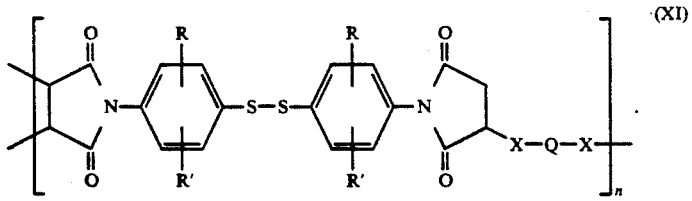

A preferred compound of the formula HX—Q—XH is bisphenol A having the formula

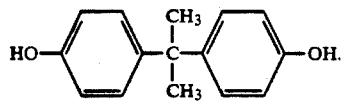

The resulting poly(imido-ethers) may have particularly desirable properties for thermally stable engineering resins.

Still further Michael addition reactions may be used to prepare novel disulfide-containing polyimides from known and available bismaleimides by reacting the latter with disulfide-containing dihydrazides. The dihydrazides may be aliphatic or aromatic and have the formula

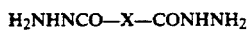

wherein X is a divalent aliphatic, aromatic, or alkyl aromatic radical of 6 to 25 carbon atoms. The polyimides may be solubilized, reformed, or modified according to methods described above.

The disulfide-containing polyimides of the invention may be designed for multiple uses and applications. For example, siloxane-modified polyimides have been recently developed as coatings for microelectronic components and as high temperature adhesives. Siloxane-modified disulfide-containing polyimides of the invention could be removed from such microelectronic components by reduction reactions and efficient processes. This may facilitate the reprocessing and repair of costly electronic devices. In still other polymer systems, e.g., composites and laminates, where polyimides are used, application of the invention may permit solubilization and recovery of valuable and costly materials in efficient processes. The recoverable polyimides of the invention are of primary importance in the effort to solve the problems of recycling polymeric materials and particularly thermosets.

The invention also provides great flexibility in modifying the polyimides after they are solubilized. The soluble polymers may be crosslinked anew by oxidation of the thiol groups formed. By reacting the thiol groups with compounds selected for specific structural reasons, it is possible to obtain valuable new polyimide structures. For example, reactive polyfunctional compounds for forming stable covalent bonds, e.g., dihalides, bismaleimides, etc., may be employed and other components may be used to produce specific functional groups. Modifiers for increasing the solubility, plasticization, compatibility and other functions of the solubilized recured resin may also be used.

In an important embodiment, the invention is valuable for the production of inherently photosensitive polyimides, for example, those obtained from ortho-alkyl substituted monomers of formula VII. Such compounds have the formula

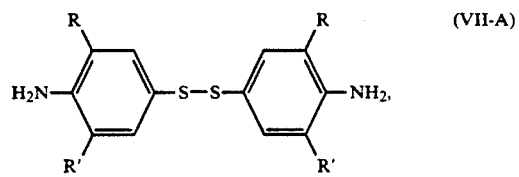

wherein R and R' are alkyl groups such as methyl, ethyl, and isopropyl. The compounds of formula VII-A are reacted with benzophenone tetracarboxylic dianhydride (BTDA) or other compounds containing an aromatic keto group to form photosensitive polyimides having the formula

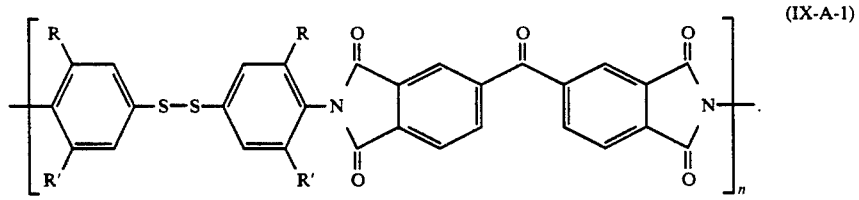

Photosensitive polyimides may also be obtained by reacting ortho-alkyl substituted bismaleimides of formula I, i.e., compounds having the formula

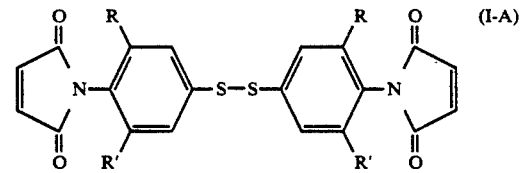

with a comonomer in which an aromatic keto group is present.

An important advantage of the invention is the ability to produce a highly desirable class of photosensitive polyimides, namely, positive working polyimide photoresists. These may be prepared by reaction of the reduced thiol-containing polyimide with dihalo-aromatic hydrocarbon (e.g., diiodobenzene, dibromobenzene, 4-iodophenylether, 4-bromophenyl ether) to yield phenylene sulfide moieties which can subsequently be converted to triaryl sulfonium salt groups. Polyimides of this structure can undergo photoinduced main chain cleavage using UV irradiation and are candidates for positive working, high temperature photoresist materials.

An example of such a reaction is shown below where equation (1) schematically represents the reduction of a disulfide-containing segment in a polyimide prepared from dithiodianiline by condensation with a tetracarboxylic acid dianhydride or from the bismaleimide of dithiodianiline (DTDA) by thermal curing.

The reduced, soluble, mercaptan-containing polymer produced by reaction (1) can be converted to the aryl sulfide-containing polymer shown as the product of equation (2), where the mercapto groups are reacted with a dihalobenzene ($XC_6H_4X$), by known procedures. The photochemical reaction of dihalobenzene in liquid ammonia is a preferred method because it does not require elevated temperature or severe conditions, and it has been shown to yield disubstitution products in high yield (J. F. Bunnett and X. Creary, J. Org. Chem. 39, 3173; 3611 (1974)). The aryl sulfide-containing polyimide obtained by the reaction shown in equation (2) can be converted to the triarylsulfonium salt by arylation, for example with diphenyliodonium hexafluorophosphate or with diphenyliodonium hexafluoroarsenate as shown in equation (3). The desired level of arylation of the sulfur-containing polyimide may be attained by adjusting the stoichiometry (J. V. Crivello et al., Journal of Polymer Science (Chemistry edition) 25:3293 (1987)), and the optimal photoresponse of the arylated polymer can then be determined.

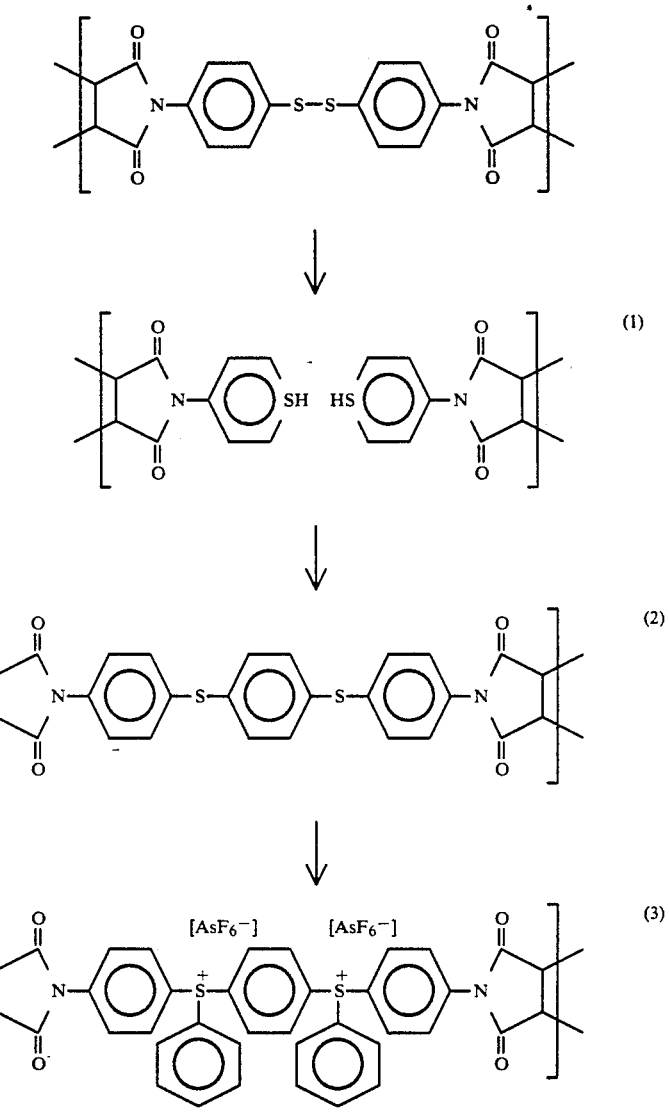

Equation (1): Reduction
Equation (2): Thioether formation

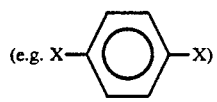

Equation (3): Triphenylsulfonium salt

(Ref.—J. V. Crivello et al., *J. Polymer Sci (Chemistry)* 25:3293–3309 (1987).

EXAMPLES

Materials and Methods

Dithiodianiline (DTDA) and methylene dianiline (MDA) were recrystallized from methanol/water. Methylene dianiline bismaleimide (MDABM), tri n-butyl phosphine (Bu$_3$P), triethylamine (TEA), diglyme, dry N, N-dimethyl acetamide (DMAc), dry N, N-dimethyl formamide (DMF)—all (Aldrich)—were used as received. Benzophenone tetracarboxylic acid dianhydride (BTDA)—Aldrich—was recrystallized from acetic anhydride.

The following abbreviations are used throughout the discussion.

DTDA 4,4'-dithiodianiline
DTDABM 4,4'-dithiodianiline bismaleimide
MDA methylene dianiline
MDABM methylene dianiline bismaleimide
BTDA 3,3',4,4'-benzophenone tetracarboxylic acid dianhydride
DMF N,N-dimethyl formamide
DMAc N,N-dimethyl acetamide
THF tetrahydrofuran
DSC differential scanning calorimetry
TGA thermogravimetric analysis
GPC gel permeation chromatography

EXAMPLE I

Cure, Reduction, and Reoxidation of Homopolymer from Dithiodianiline Bismaleimide (DTDABM)

Synthesis of 4,4'-dithiodianiline (DTDA) bismaleimide 3.355 g of DTDA was dissolved in 10 ml dry dimethylacetamide (DMAc) and added under nitrogen, via a dropping funnel, to 2.649 g of maleic anhydride dissolved in 10 ml dry DMAc, with constant stirring. The solution was stirred for 2 hrs. and poured into water. The yellow precipitate was filtered and dried in a vacuum oven to give 6.002 g (99.9%) of crude amic acid.

To 4.287 g of the amic acid was added 1 g fused sodium acetate and 10 ml acetic anhydride. The solution was stirred under nitrogen in an oil bath kept at 85°±3° C. for 4 hrs. The solution was then cooled and poured into water. The bright yellow solid was filtered, washed with dilute sodium bicarbonate, water, and methanol, and dried to give 3.885 g (98.6%) of crude product. Recrystallization from benzene/methanol afforded 3.420 kg (86.8%) of the bismaleimide.

Curing of 4,4'-dithiodianiline (DTDA) bismaleimide

A cure temperature of 240° C. (as determined from DSC) was used. About 2 grams of the bismaleimide (I) was dissolved in minimal DMAc in a Teflon beaker. The beaker was then placed in a vacuum oven at 100° C. to remove the solvent. Once the solvent was removed, the temperature of the oven was raised to 240° C. and kept at this temperature for 4 hrs. The dark red resin (II) was cooled and ground (with liquid N$_2$) to 600 µ size particles (T$_D$=352° C.) : Tg (DSC) 334° C.

Reduction of bismaleimide resin (II)

1.300 g of the resin was transferred to a 50 ml round bottomed flask. 30 ml of diglyme, 10 ml of tributyl phosphine, and 4 drops of water (obtained from 15 ml H$_2$O containing 2 drops conc. HCl) were then added. The solution was refluxed under nitrogen for 4 hrs. About half the diglyme was then distilled off. The solution remaining was cooled and poured into methanol. The solution was allowed to stand overnight. The methanol was decanted. To the solid left at the bottom, a few drops of water were added to further aggregate the solid, which was then filtered and dried to give 0.812 g of a pink solid. The reduced product is shown schematically in Formula II. It was soluble in organic solvents, demonstrating cleavage of the crosslinked structure.

Reoxidation of soluble polymer

About 0.5 g of the reduced product Formula III was dissolved in 5 ml DMAc. To this solution was added a 10% iodine solution in DMAc, with constant stirring, until a precipitate started forming. The solution was then heated to 60° C., and addition of the iodine solution was continued drop by drop until no more precipitate was visually observed. 10 ml additional DMAc was added to the mixture which was stirred at 60° C. for 1 hr. The solid was filtered, washed with methanol, and dried at 100° C. in a vacuum oven.
T$_D$=372° C. (N2, 20° C./min.)
T$_g$=329.5° C.

The thermal response of homopolymers prepared from compound I under different conditions of curing is shown in Table 1. The polyimide obtained with a 300° C./N$_2$/4 hours cure profile gave a 13° C. rise in the onset of decomposition and no difference in the Tg as compared to the 240° C./vac/4 hours cure profile. Curing at 350° C. resulted in higher onset of decomposition temperature and high residue content at 700° C. (Table 2). Reoxidation of reduced polymer from the 300° C.-cured polyimide gave a product with decomposition and glass transition temperatures similar to those of the 240° C.-cured resin (Table 2).

EXAMPLE II

Cure, Reduction and Reoxidation of DTDABM-Methylene Dianiline Bismaleimide (MDABM) at 1:1 Ratio (Copolymer)

Copolymerization

The copolyimide from DTDABM and MDABM in a 1:1 molar ratio was synthesized by weighing appropriate amounts into a teflon beaker and adding minimal DMAc to obtain a clear solution. Two such samples were made. The solvent was removed by placing the beakers in a vacuum oven at 100° C. overnight. One sample was cured at 300° C. for 4 hours in nitrogen, and the second sample was cured at 350° C. for 4 hours in nitrogen. As in the case of hompolymers, curing at 350° C. gave a high residue at 700° C. (Table 2) possibly indicating side reactions during cure. Further reactions described below were carried out on the 300° C.-cured copolyimide (Tg 347.8 by DSC).

Reduction

To 0.5 grams of the copolymer resin in a 35 ml round bottomed flash was added 15 ml DMAc, 4 ml Bu$_3$P and 3 drops of water (obtained from a stock solution of 15 ml H$_2$O containing 2 drops conc. HCl). The reaction mixture was refluxed under nitrogen for 48 hours. A small amount of resin was still insoluble. The solution was filtered. The residue was dried and weighed (0.1455 g) giving 29.1% unreduced resin. The filtrate was poured into water and the solid obtained was filtered, dried and weighed (0.3535 g) giving 70.7% reduced, soluble polymer. Thermal properties and —SH content are given in Table 2.

The equimolar ratio of the two bismaleimide monomers does not necessarily yield an ideal alternating copolyimide, and thus MDA/BM blocks devoid of disulfide bonds may not be reduced and remain insoluble.

Reoxidation 0.1 g of the reduced soluble polymer was dissolved in 5 ml DMAc. A 10% iodine solution in DMAc was added dropwise until the color of the iodine persisted. About 10 more drops of the iodine solution was added. The solution was warmed to 60° C. for 15 minutes and allowed to stand at room temperature for 24 hours. The mixture was poured into water and the precipitate filtered and dried. Thermal properties are given in Table 2.

The $T_D$ and $T_g$ of the reoxidized copolymer did not reach those of the parent resin as was the case for reoxidized homopolymer from dithiodianiline bismaleimide.

EXAMPLE III

Synthesis, Reduction and Reoxidation of Michael-Addition Type Polyimides

Synthesis of polymer from DTDA/BM and MDA

The procedure of Crivello (J. P. Crivello, Journal of Polymer Science (Chemistry Ed.), 11:1185–1200 (1973)) was followed. To 2.0423 g (5 mmol) of DTDA/BM and 0.9913 g (5 mmol) MDA in a 100 ml round bottomed flash with a magnetic stirrer, was added 15 ml freshly distilled m-cresol and 0.2 ml glacial acetic acid. The flask was immersed in an oil bath at 105°±3° C. and fitted with a reflux condenser. The solution was stirred under nitrogen for 68 hours. The viscosity of the reaction mixture visually increased. The solution was cooled and poured into excess methanol with continuous stirring giving a fibrous polymer. The mixture was filtered and the precipitate washed with methanol. The solid was transferred to a 250 ml beaker and warmed with 50 ml ethanol at 60° C. for 15 minutes. The solution was filtered hot and the precipitate washed with ethanol. The solid was dried, yielding 3.008 g (99%) of greenish-brown polymer. Thermal properties are given in Table 2.

Reduction

To 0.3 g of the polyimide was added 15 ml diglyme, 5 drops diluted HCl (from a stock solution of 15 ml H2O containing 2 drops conc. HCl) and 2 ml Bu3P. The solution was refluxed under nitrogen for 2 hours, cooled and poured into water. The yellow solid was filtered and dried to give 0.2782 g reduced polymer. Thermal properties and thiol content are given in Table 2. Thiol content was determined by the method of Bald (E. Bald: *Talanta* 27:281 (1980)).

Reoxidation 0.2 g of the soluble polymer was dissolved in 5 ml DMAc. A 10% iodine solution in DMAc was added dropwise until the color of the iodine persisted. The solution was warmed to 60° C. and stirred for 15 minutes, then cooled and let stand at room temperature for 24 hours. The solution was poured into excess water and the solid filtered and dried. Thermal properties are given in Table 2.

EXAMPLE IV

Synthesis, Reduction and Reoxidation of Michael-Addition Type Polyimides

Synthesis of polymer from DTDA and MDABM

The procedure for the DTDABM/MDA polymer was followed using 1.2418 g DTDA and 1.7918 g MDABM to give 2.891 (95.3%) of polymer, thermal properties of which are given in Table 2.

Reduction

The procedure was similar to that for the DTDABM/MDA polymer using 0.3 grams of the polymer and a reduction time of 1 hour to give 0.24 g of reduced polymer. Thermal properties and thiol content are given in Table 2.

Reoxidation

The procedure as for the DTDABM/MDA was followed. Table 2, gives thermal properties of the reoxidized polymer.

Decomposition and glass transition temperatures for the addition polyimides (Table 2) were in expected ranges. The polymers were fairly soluble in diglyme. Reduction of the polymers was relatively fast, but reoxidation gave polymers of poor thermal stability—especially in the case of the DTDA/MDABM polymer.

EXAMPLE V

Synthesis, Reduction and Reoxidation of DTDA/BTDA Condensation Polyimide

Synthesis of polymer from DTDA and BTDA

To 2.4837 g. (0.01 mol) DTDA in a 100 ml round bottomed flash was added 20 ml dry DMAc. Once the diamine had dissolved, 3.2223 g (0.01 mol) BTDA was added to the solution. The reaction mixture was stirred under nitrogen for 6 hours, then poured into excess methanol. The solid polyamic acid was filtered and dried in a vacuum oven overnight at 60° C. The bright yellow solid was ground in a blender to 600 micron size particles and cured at 250° C. in vacuum for 5 hours to given an orange colored polyimide. Thermal properties are given in Table 2.

Reduction

To 0.5 g of the polymer was added 3 ml Bu3P, 15 ml diglyme and 5 drops dil. HCl (from a stock solution of 15 ml H2O containing 2 drops conc. HCl). The reaction mixture was refluxed under nitrogen for 30 hours until the polymer completely dissolved. The solution was cooled and poured into water. The water was carefully decanted from the orange viscous liquid. The product was washed once more with water, decanting the water, and the viscous liquid was dried under high vacuum for 24 hours at room temperature to give 0.4877 g of the reduced polymer.

Reoxidation

To 0.2 g of the reduced polymer in 5 ml DMAc was added dropwise at 10% iodine solution in DMAc until the iodine color persisted. The solution was warmed to 60° C. for 15 minutes, cooled, and let stand at room temperature for 24 hours. The insoluble precipitate was filtered and dried to give 0.168 g of reoxidized polymer, the thermal properties of which are given in Table 2.

Reduction to complete solubility of the condensation polymer of DTDA and BTDA was possible after 30 hours. The reduced polymer was a viscous liquid. Reoxidation of this liquid gave an insoluble polymer. The onset of decomposition temperature of the reoxidized material ($T_D=242°$ C.) was significantly lower than that of the original polyimide ($T_D=533°$ C.), as was the glass transition temperature ($T_g=178.5°$ C. reoxidized polymer; $T_g=240.2°$ C.—original polyimide).

TABLE 1
THERMAL PROPERTIES OF CURED BISMALEIMIDE RESINS FROM DTDA/BM AND MDA/BM

| BISMALEIMIDE | CURING CONDITIONS (°C./hrs.) | TGA ($N_2$) $T_D$ °C. | 20° C./Min. % Residue at 700° C. | DSC ($N_2$) 10° C./min. $T_g{}^c$ |
|---|---|---|---|---|
| DTDA/BM | (240/4) vac | 345.4 | 46.6 | 334 |
| DTDA/BM | (300/4) $N_2$ | 358.7 | 42.2 | 334.1 |
| DTDA/BM | (350/4) $N_2$ | 547.7 | 77.5 | — |
| DTDABM/MDABM (1:1) | (300/4) $N_2$ | 425.7 | 45.9 | 347.8 |
| DTDABM/MDABM (1:1) | (350/4) $N_2$ | 592.5 | 81.7 | — |

TABLE 2

| | FULLY CURED POLYMER | | | REDUCTION | | | | REOXIDATION | | |
|---|---|---|---|---|---|---|---|---|---|---|
| | CURING CONDITIONS (°C./hrs.) | $T_D$ °C.${}^a$ | $T_g$ °C.${}^a$ | REDUCTION* (solvent/hrs.) | $T_D$ °C.${}^a$ | $T_D$ °C.${}^b$ | -SH CONTENT (meq/gm) | OXIDATION CONDITION | $T_D$ °C.${}^a$ | $T_g$ °C. |
| DTDABM | (250/4) vac. | 352.4 | 334 | (diglyme/4) | 185.9 | 144.7 | 3.65 | $I_2$/DMF | 372 | 329.5 |
| DTDABM' | (300/4) $N_2$ | 358.7 | 334.1 | (diglyme/4) | 182.6 | 177.5 | 2.42 | $I_2$/DMF | 373.6 | 329.5 |
| DTDABM/MDABM (1:1) | (300/4) $N_2$ | 425.7 | 347.8 | (DMAc/48) | 291.8 | 197.8 | 1.04 | $I_2$/DMF 24 hrs. | 242.7 | 139.0 |
| DTDABM/MDA (1:1) | (100–110/3) m-cresol, AcOH | 328.2 | 266.5 | (diglyme/2) | 260.8 | 106.7 | 1.68 | $I_2$/DMAc 24 hrs. | 242.2 | 146.6 |
| DTDA/MDABM (1:1) | (100–110/3) n-cresol, AcOh | 304.3 | 246.7 | (diglyme/1) | 265.1 | 106.9 | 1.19 | $I_2$/DMAc 24 hrs. | 155.8 | 128.1 |
| DTDA/BTDA (1:1) | (250/5) vac., amic acid | 533.9 | 240.2 | (diglyme/30) | — | — | 1.39 | $I_2$/DMAc 24 hrs. | 232 | 178.5 |

${}^a$TGA ($N_2$): 20° C./min.
${}^b$DSC ($N_2$): 10° C./min.
${}^c$Not reduced to complete solubility
*$Bu_3$P/solvent/reflux hrs.

What is claimed is:

1. A method for the conversion to a soluble polymer of a polyimide having the formula

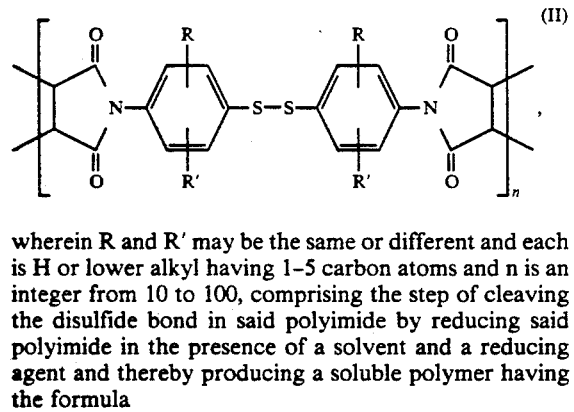

wherein R and R' may be the same or different and each is H or lower alkyl having 1-5 carbon atoms and n is an integer from 10 to 100, comprising the step of cleaving the disulfide bond in said polyimide by reducing said polyimide in the presence of a solvent and a reducing agent and thereby producing a soluble polymer having the formula

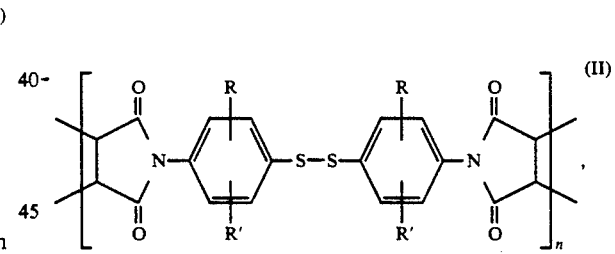

wherein R and R' may be the same or different and each is H or lower alkyl having 1-5 carbon atoms and n is an integer from 10 to 100, from a polymer having the formula

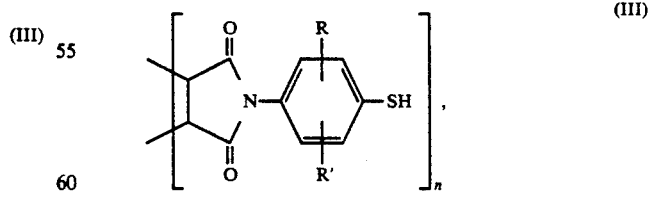

comprising the steps of reforming the disulfide bonds by oxidizing the said polymer to reform the said polyimide.

2. A method as recited in claim 1 wherein said reducing agent is selected from the group consisting of tributyl phosphine, triphenyl phosphine, sodium borohydride, and an alkali metal hydride.

3. A method for reforming a polyimide having the formula

4. A method as recited in claim 2 wherein the oxidizing agent is selected from the group consisting of iodine, air and hydrogen peroxide.

5. A method for reprocessing a polyimide having the formula

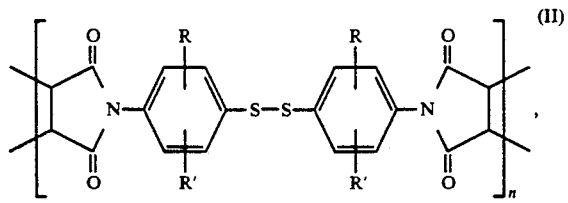

wherein R and R' may be the same or different and each is H or lower alkyl having 1-5 carbon atoms and n is an integer from 10 to 100, and thereafter reforming the said polyimide, comprising the steps of:

(a) cleaving the disulfide bonds in said polyimide by reducing said polyimide in the presence of a solvent and a reducing agent and thereby forming a soluble polymer having the formula

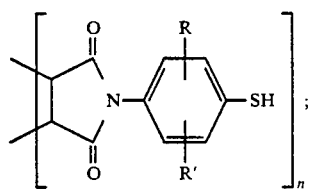

and (b) reforming the disulfide bonds by oxidizing the cleaved mixture formed in step (a) to reform the said polyimide.

6. A method as recited in claim 5 wherein the reducing agent is selected from the group consisting of tributyl phosphine, triphenyl phosphine, sodium borohydride, and an alkali metal hydride and the oxidizing agent is selected from the group consisting of iodine, air and hydrogen peroxide.

7. A soluble polyimide having the formula

'wherein R and R' may be the same or different and each is H or lower alkyl having 1-5 carbon atoms and n is an integer from 10-100.

8. A soluble polyimide as recited in claim 7 wherein R and R' are H.

9. A method for the conversion to a soluble polymer of a polyimide having the formula

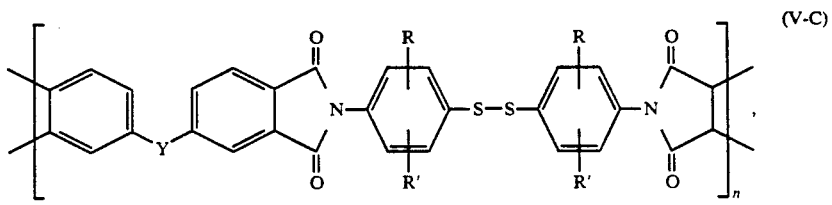

wherein R and R' may be the same or different and each is H or lower alkyl having 1-5 carbon atoms, n is an integer from 10 to 100, Y is an aliphatic or aralkyl hydrocarbon radical of 3 to 10 carbon atoms or

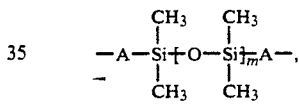

A is a divalent alkyl or aryl radical having 3 to 6 carbon atoms, and m is an integer from 3 to 6, comprising the step of cleaving the disulfide bonds in said copolyimide by reducing said copolyimide in the presence of a solvent and a reducing agent and thereby producing a soluble polymer having the formula

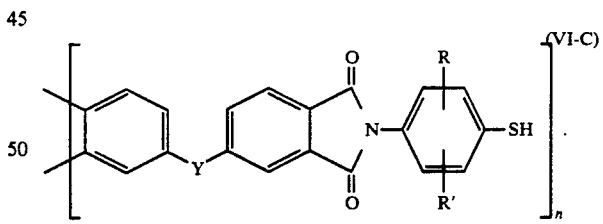

10. A method for reforming a polyimide having the formula

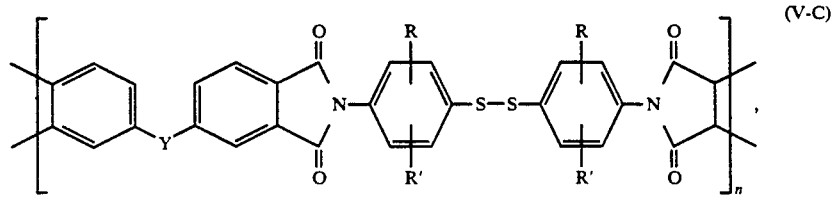

wherein R and $R^1$ may be the same or different and each is H or lower alkyl having 1-5 carbon atoms, n is an integer from 10 to 100, Y is an aliphatic or aralkyl hydrocarbon radical of 3 to 10 carbon atoms or

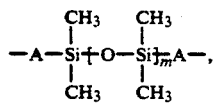

A is a divalent alkyl or aryl radical having 3 to 6 carbon atoms, and m is an integer from 3 to 6 from a soluble polymer having the formula

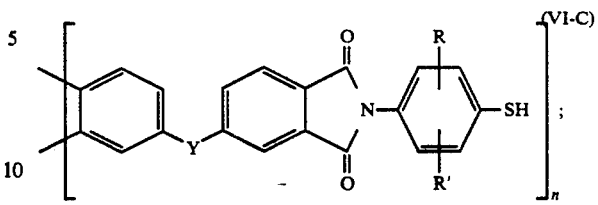

comprising the step of reforming the disulfide bonds by oxidizing the said polymer to reform the said polyimide.

11. A method for solubilizing a copolyimide having the formula

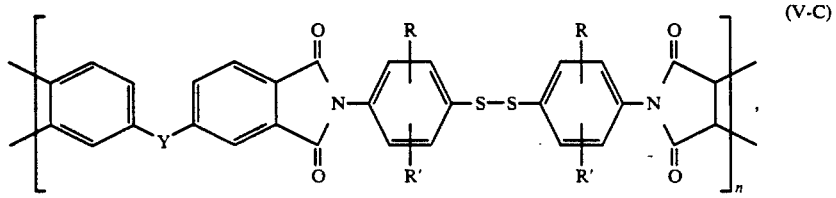

R and R' may be the same or different and each is H or lower alkyl having 1-5 carbon atoms, n is an integer from 10 to 100, and Y is an aliphatic or aralkyl hydrocarbon radical of 3 to 10 carbon atoms or

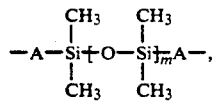

A is a divalent alkyl or aryl radical having 3 to 6 carbon atoms, and m is an integer from 1 to 10, and thereafter reforming the said polyimide, comprising the steps of
(a) cleaving the disulfide bonds in said polyimide by reducing said polyimide in the presence of a solvent and a reducing agent and thereby forming a soluble polymer having the formula

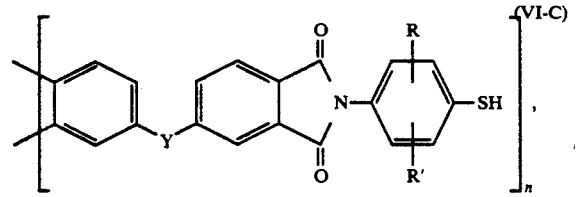

and
(b) reforming the disulfide bonds by oxidizing the cleaved mixture formed in step (a) to reform said polyimide.

12. A soluble copolyimide having the formula

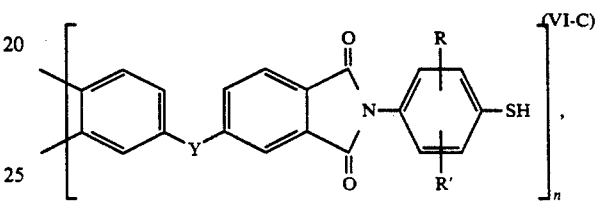

wherein R and R' may be the same or different and each is H or lower alkyl having 1-5 carbon atoms, and Y is an aliphatic or aralkyl hydrocarbon radical of 3 to 10 carbon atoms or

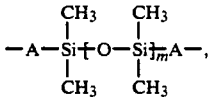

a is a divalent aryl or alkyl radical having 3 to 6 carbon atoms and n is an integer from 10-100, and m is an integer from 1 to 10.

* * * * *

UNITED STATES PATENT AND TRADEMARK OFFICE
CERTIFICATE OF CORRECTION

PATENT NO. : 5,260,411
DATED : Nov. 9, 1993
INVENTOR(S) : Giuliana C. Tesoro, et al.

It is certified that error appears in the above-indentified patent and that said Letters Patent is hereby corrected as shown below:

Column 21, line 37, before "R" insert --wherein--

Column 22, line 48, change "a" to --A--.

Signed and Sealed this

Fifth Day of July, 1994

Attest:

*Attesting Officer*

BRUCE LEHMAN

*Commissioner of Patents and Trademarks*